United States Patent [19]

Kamiko

[11] Patent Number: 4,653,856
[45] Date of Patent: Mar. 31, 1987

[54] SUPPORT CONSTRUCTION FOR OPTICAL SYSTEMS

[75] Inventor: Mitsuo Kamiko, Yokohama, Japan
[73] Assignee: Alps Electric Co., Ltd., Japan
[21] Appl. No.: 630,945
[22] Filed: Jul. 16, 1984
[30] Foreign Application Priority Data
 Jul. 15, 1983 [JP] Japan ............................ 58-109638[U]
[51] Int. Cl.⁴ .......................... G02B 27/16; G02B 7/02
[52] U.S. Cl. ...................................... 350/255; 350/247
[58] Field of Search ................................ 350/247, 255

[56] References Cited

U.S. PATENT DOCUMENTS 4,032,776 6/1977 van Rosmalen ..................... 350/255
4,302,830 11/1981 Hamaoha et al. .................... 350/247

Primary Examiner—John K. Corbin
Assistant Examiner—Loha Ben
Attorney, Agent, or Firm—Guy W. Shoup

[57] ABSTRACT

A support construction for an optical pick-up, such as used in a compact disc player, has a first leaf spring with an elongated opening defined between opposite sides in the longitudinal direction and an optical lens support centrally in the opening by a pair of support members extending from the opposite sides to allow the lens to be moved by a voice coil toward or away from the compact disc without sidewards deviation. The first leaf spring is supported on an intermediate base, and the intermediate base is supported by a pair of second leaf springs of similar construction, in order to allow the intermediate base to be finely adjusted by another coil in a plane parallel to the disc. The pair of second leaf springs are mounted to a slider which is driven radially of the compact disc.

5 Claims, 6 Drawing Figures

SUPPORT CONSTRUCTION FOR OPTICAL SYSTEMS

BACKGROUND OF THE INVENTION

The present invention relates to an optical pickup in a digital audio disc (DAD) player such as a compact disc (CD) player, and more particularly to a support construction for supporting a movable member on which an optical system component such as an objective lens confronting a recording medium, while allowing the movable member to be driven in small intervals.

[Principles of an Optical Pickup]

Optical pickups have been employed in CD players that have become available in the recent past. FIG. 1 of the accompanying drawings schematically illustrates an arrangement of such an optical pickup. A disc 1 for use in a CD player has a reflecting information-recorded surface 1b disposed inwardly of a light-transmissive layer 1a, the surface 1b having pits p by which information is digitally recorded along tracks on the surface 1b. The optical pickup includes a light source comprising a laser diode 2 for emitting a laser beam which will pass through a beam splitter 3, a collimating lens 4 by which the rays of the beam are rendered parallel, and a ¼-wave plate 6, and then be reflected by a prism 7 toward an objective lens 8. The objective lens 8 forms a beam spot on the information-recorded surface 1b. A beam reflected by the surface 1b or the pits p then travels through the objective lens 8, the prism 7, and the ¼-wave plate 6 toward the beam splitter 3. Since the reflected beam has its plane of polarization turned through 90 degrees, the reflected beam is reflected at an angle of 90 degrees in the beam splitter 3 and is detected by a photodetector such as a photodiode 10 through a cylindrical lens 9. The photodiode 10 then detects the presence or absence of pits p through the intensity of the beam spot which has been modulated by the pits p.

The optical pickup also includes a focusing servomechanism 11 for focusing the laser beam on the information-recorded surface 1b and a tracking servomechanism 12 for enabling the beam spot to follow the tracks on the surface 1b. The focusing servomechanism 11 is composed of a magnetic circuit comprising a voice coil 11a coupled to the objective lens 8, a magnet 11b and a yoke 11c for driving the voice coil 11a. The tracking servomechanism 12 comprises a voice coil 12a, a magnet 12b and a yoke 12c for driving the voice coil 12a, the voice coil 12a being attached to an actuator 13 composed of the objective lens 8, the focusing servomechanism 11, and the prism 7. In the focusing servomechanism 11, a current flowing through the voice coil 11a is varied to move the objective lens 8 slightly vertically as shown in the actuator 13. In the tracking servomechanism 12, a current flowing through the voice coil 12a is varied to move the actuator 13 slightly horizontally as shown. Through such movements in small intervals, the beam spot can be focused on the information-recorded surface 1b and follow the tracks on the surface 1b by way of corrective operation.

[Prior Art and its Problems]

In the above servomechanisms, the objective lens and the actuator 13 which are to be driven should be supported so as to be reciprocally movable in small intervals and return under the force of a resilient member such as a leaf spring.

Heretofore, the support construction has employed a plurality of leaf springs or a leaf spring of a complex configuration and structure, and hence has been complicated in structure. Since a support leaf spring for allowing the objective lens to focus the laser beam under servo control is combined with a support leaf spring for allowing the actuator 13 to follow the tracks on the disc under servo control, the leaf spring arrangement in the optical pickup is complex, and the optical pickup cannot be rendered more compact.

SUMMARY OF THE INVENTION

It is an object of the present invention to provide a support construction in optical systems which has a simple leaf spring support structure and is small in overall size.

According to the present invention, there is provided a support construction for an optical pickup, comprising a single leaf spring having an opening defined between first opposite sides and second opposite sides and a pair of support members extending from the first opposite sides into the opening, a fixed member on which the second sides are fixedly mounted, and an optical system component supported on the support members.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
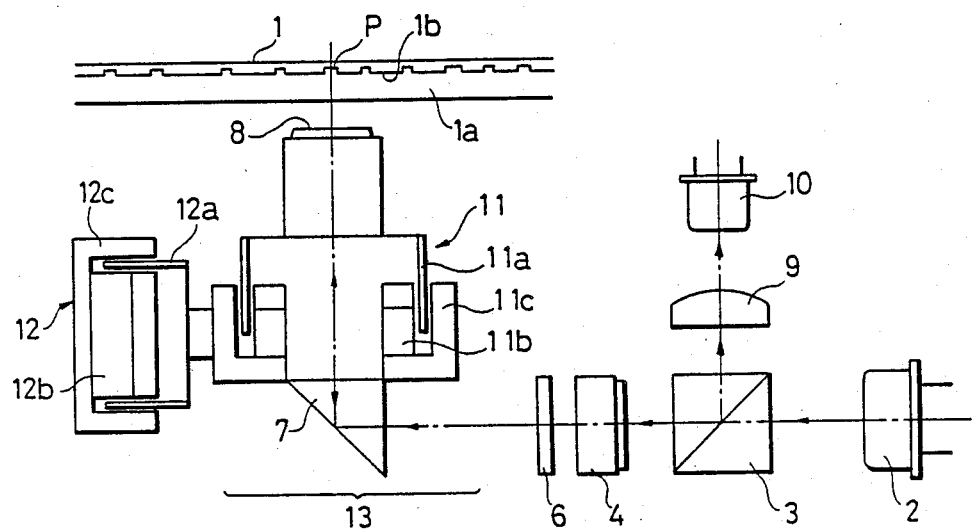
FIG. 1 is a schematic view of an arrangement of an optical pickup, the view being illustrative of the principles of operation thereof.
Figure 2:
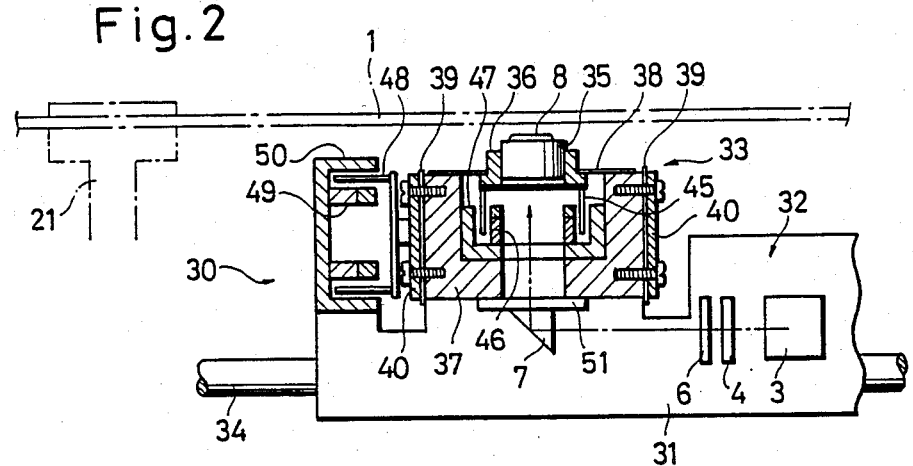
FIG. 2 is a cross-sectional side view of a support construction for an optical pickup in accordance with the invention.

As shown in FIG. 2, a compact disc (CD) player includes a turntable 21 for clamping a central portion of a compact disc 1, the turntable 21 being motor-driven for rotating the compact disc 1. The CD player also has an optical pickup 30 disposed below the compact disc 1 for reading information recorded in the compact disc 1. The optical pickup 30 comprises a slider 31, an optical detector 32 mounted on the slider 31, and an actuator 33 mounted on the slider 31. The optical detector 32 is composed of the same parts as shown in FIG. 1, such as the laser diode 2, the beam splitter 3, the collimating lens 4, the ¼-wave plate 6, the cylindrical lens 9, and the photodiode 10. The actuator 33 serves to drive the objective lens 8 for focusing and tracking correction under servo control.

The slider 31 is guided for movement by two parallel guide shafts 34 (only one shown in FIG. 2), one of which comprises a screw shaft. In response to rotation of the screw shaft, the slider 31 is moved horizontally in FIG. 2 (to the right when reading information from the compact disc) in a direction radially across the tracks on the surface 1b of the compact disc 1. This movement of the slider 31 may be termed "rough feeding".

Figure 3:
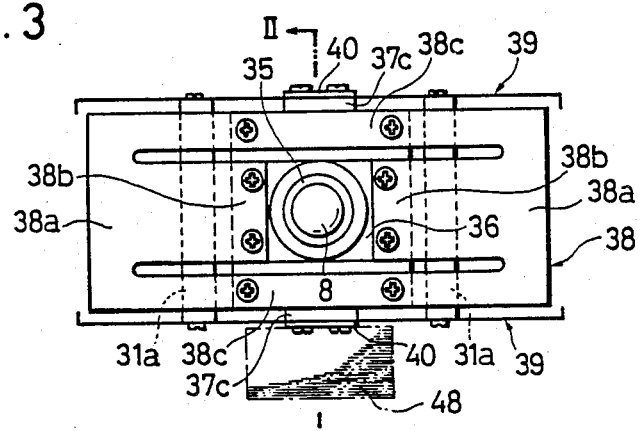
FIG. 3 is a plan view of the optical pickup shown in FIG. 2.
Figure 4:
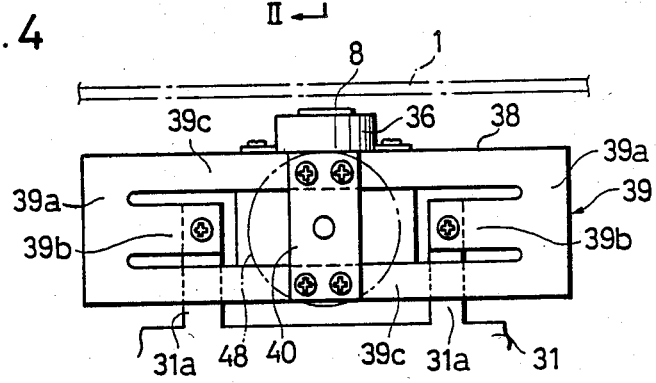
FIG. 4 is a front elevational view of the optical pickup shown in FIG. 2.

The actuator 33 will now be described with its leaf spring support structures with reference to FIGS. 3 and 4.

The objective lens 8 disposed in confronting relation to the compact disc 1 is mounted in a lens barrel 35 held a movable member 36. The movable member 36 is supported by a leaf spring 38 on an intermediate base 37 which is supported by two leaf springs 39, 39 on the slider 31. The movable member 36 and the intermediate base 37 which serve as a holder for optical system components are formed of a light material such as aluminum.

Figure 5:
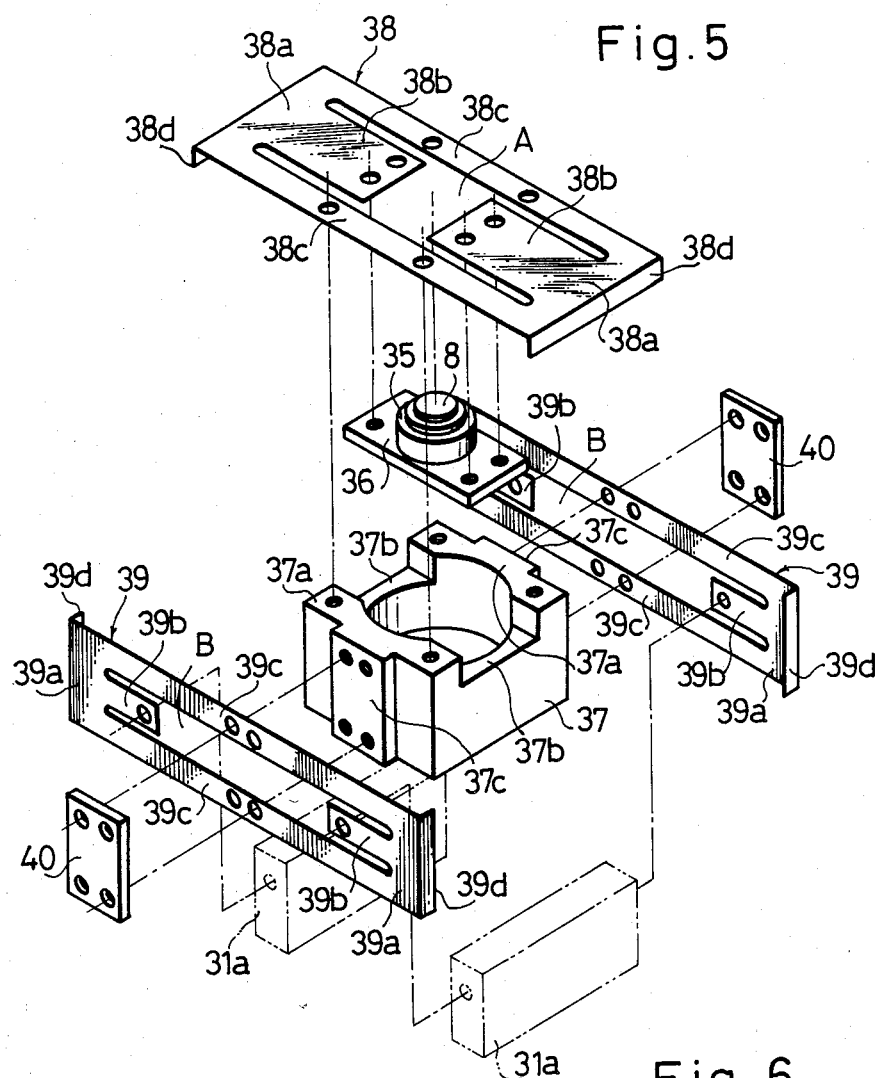
FIG. 5 is an exploded perspective view of a support construction for the optical pickup.
Figure 6:
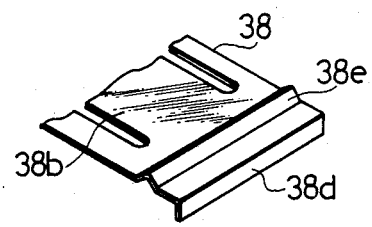
FIG. 6 is a fragmentary perspective view of a leaf spring reinforcement.

As shown in detail in FIG. 5, the leaf spring 38 is formed of a spring material in the shape of a rectangle having a central opening A. The leaf spring 38 includes two support members 38b extending integrally from shorter sides of the leaf spring 38 toward each other into the opening A. The leaf spring 38 also has longer sides 38c screwed to upper opposite edges of the intermediate base 37. The movable member 36 has longitudinal ends fixed to distal ends of the two support members 38b of the leaf spring 38. As a consequence, the movable member 36 is positioned in an upper recess 37b in the intermediate base 37, and supported for vertical elastic deformation with respect to the intermediate base 37. The longitudinal ends of the leaf spring 38 have bent portions 38d for greater rigidity. As shown in FIG. 6, each end of the leaf spring 38 may also have rib 38e in the form of a mountain fold, and the bent portion 38d may be omitted.

The two leaf springs 39 by which the intermediate base 37 is supported are of the same shape and disposed in confronting symmetrical relation. Each of the leaf springs 39 is formed of a spring material into a rectangular shape having a central opening B. The leaf spring 39 includes two support members 39b extending integrally from shorter sides of the leaf spring 39 toward each other into the opening B. The leaf spring 39 also has longer sides 39c having central portions attached to a raised attachment surface 37c on a side of the intermediate base 37. A holder plate 40 is held against the leaf spring 39 to sandwich the leaf spring 39 between the holder plate 40 and the attachment surface 37c. The leaf spring 39 has support members 39b fixed as by screws to sides of attachment projections 31a on the slider 31. The leaf spring 39 includes bent longitudinal ends 39d, and may also have ribs in the form of a mountain fold on the ends thereof. The two leaf springs 39, 39 are fixedly positioned in mutually confronting relation. Thus, the intermediate base 37 is supported on its opposite sides by the leaf springs 39 between the attachment projections 31a so as to be elastically reciprocally movable in lateral directions in FIG. 2.

As illustrated in FIG. 2, a voice coil 45 is mounted on a lower surface of the movable member 36 in concentric relation to the axis of the objective lens 8. A magnetic circuit composed of a magnet 46 and a yoke 47 is disposed in a central recess in the intermediate base 37 with the voice coil 45 inserted in a slit in the magnetic circuit. The voice coil 45, the magnet 46, and the yoke 47 jointly constitute a focusing servomechanism.

A voice coil 48 is attached to a side of the intermediate base 37. The voice coil 48 is positioned at the same height as that of the supporting leaf spring attached to the projections 31a (FIG. 4). The voice coil 48 is disposed in a magnetic circuit composed of a magnet 49 and a yoke 50. The voice coil 48, the magnet 49, and the yoke 50 jointly constitute a tracking servomechanism. A prism 7 (which is the same as the prism shown in FIG. 1) is mounted by an attachment plate 51 to the bottom of the intermediate base 37. A laser beam emitted from the optical detector 32 is reflected in a 90°-deviated direction by the prism 7 and passes through the intermediate base 37 to the objective lens 8.

According to the present invention, two support constructions are employed in the optical pickup 30 as described above. One support construction is used for supporting the movable member 36 (by which the objective lens 8 is supported) on the intermediate base 37, and the other support construction is used for supporting the intermediate base 37 (by which the objective lens 8 and the focusing servomechanism are supported) on the slider 31 (FIG. 2).

The leaf springs 38, 39 in the support constructions have the central openings A, B and include the integral support members 38b, 39b extending from the sides 38a, 39b into the openings A, B. The leaf spring 38 supporting the movable member 36 has its longitudinal sides 38c fixed to the intermediate base 37 and the support members 38b supporting the movable member 36. The leaf springs 39 supporting the intermediate base 37 have their support members 39b fixed to the attachment projections 31a of the slider 31 and the sides 39c supporting the intermediate base 37.

Information reading operation of the optical pickup 30 will now be described.

The compact disc 1 is clamped on the turntable 21 and driven to rotate by the motor. The screw shaft, which may be one of the guide shafts 34 (FIG. 2) is driven by a motor (not shown) to rotate ,about its own axis to move the slider 31 to the right (FIG. 2). Information recorded along the spiral tracks in the compact disc 1 is read by the objective lens 8.

The beam spot is corrected at this time by the focusing servomechanism, the tracking servomechanism, and a rotation adjustment mechanism (omitted from description). The beam spot can be focused on the information-recorded surface 1b (FIG. 1) in the compact disc 1 by varying a current flowing through the voice coil 45 on the lower end of the movable member 36. By thus varying the voice coil current, the voice coil 45 disposed between the magnet 46 and the yoke 47 is moved vertically in FIG. 2. At this time, the objective lens 8 is stably moved vertically due to elastic deformation of the support members 38b and the longitudinal sides 38c of the leaf spring 38. The beam spot can be servo-controlled to follow the tracks in the compact disc 1 by varying a current flowing through the voice coil 48 attached to the intermediate base 37. By thus varying the voice coil current, the voice coil 48 disposed between the magnet 49 and the yoke 50 is driven laterally (FIG. 2). At this time, the intermediate base 37 is laterally moved due to elastic deformation of the support members 39b and the longitudinal sides 39c of the leaf springs 39.

While in the illustrated embodiment the opposite sides of the intermediate base 37 are supported by the two leaf springs 39, the intermediate base 37 may be supported by only one leaf spring 39. The shape of the leaf springs 39, 39 should not be limited to the rectangle, but may be square or circular.

The advantages gained by the present invention are as follows:

(1) Since the intermediate base (serving as a fixed member) and the objective lens (serving as an optical system component) are mounted on a single leaf spring, the optical system component can be supported on the leaf spring having a minimum thickness, and the support construction is rendered simple.

(2) The single leaf spring has a central opening and a pair of support members extending from sides thereof into the central opening and supporting the optical system component. Therefore, the optical system component is stably supported on the two support members. The presence of the central opening allows the support members and the sides to flex equally when the optical system component is in operation. The optical system component thus stably operates without being subjected to deviation from the optical axis and falling over.

(3) Since the optical system component such as an objective lens can reliably supported by the single leaf spring only, the optical pickup is simple in construction and is constructed of a reduced number of parts.

(4) As there are no large bent portions on the leaf spring, the space for the leaf spring can be utilized effectively. As illustrated, the focusing and tracking servo-mechanisms are substantially of an integral, centralized construction, resulting in a small-size actuator.

Although a certain preferred embodiment has been shown and described, it should be understood that many changes and modifications may be made therein without departing from the scope of the appended claims.

What is claimed is:

1. A support construction for supporting an optical pickup for movement relative to an intermediate base comprising:
   a first leaf spring having an elongated planar body defined by a shorter pair of first opposing sides and a longer pair of second opposing sides oriented normal to said first opposing sides and a central opening in a middle section between said first and second opposing sides,
   a pair of support members aligned with each other and extending from a respective one of said first opposing sides into said central opening and each having a distal end spaced apart in confronting relation to the other, wherein an optical system component of said optical pickup is mounted between said distal ends of said support members; and
   said longer pair of second opposing sides being mounted fixedly to said base,
   whereby said optical system component can be elastically moved relative to said base in a first direction perpendicular to the plane of said first spring without sidewards deviation movement in the plane of said first spring.

2. A support construction according to claim 4, wherein said first leaf spring has a rectantular shape, said first sides comprising shorter sides of said first leaf spring and said second sides comprising longer sides thereof.

3. A support construction according to claim 4, wherein said optical system component comprises an objective lens disposed in confronting relation to a recording medium and a movable member supporting said objective lens and fixed to distal ends of said support members, said movable member being positioned in said opening and moved by a coil.

4. A support constuction according to claim 1, further adapted for supporting said base for movement in a second direction normal to said first direction relative to a slider, comprising at least another leaf spring of the described construction, said slider being mounted to the distal ends of the support members of said other leaf spring, and said intermediate base being fixedly mounted to the longer sides of said other leaf spring, whereby said optical system component can be elastically moved relative to said slider in the second direction perpendicular to the plane of said other leaf spring without sidewards deviation movement in the plane of said other leaf spring.

5. A support construction according to claim 4, wherein said at least another leaf spring comprises a pair of leaf springs of the described construction mounted on opposite sides of said slider and mounting said intermediate base from corresponding opposite sides thereof.

* * * * *